G. F. DREHER.
PROCESS OF MAKING INSULATING FABRIC.
APPLICATION FILED AUG. 6, 1910.

1,076,874.

Patented Oct. 28, 1913.

2 SHEETS—SHEET 1.

Witnesses:
Marcus L. Byng.
J. Ellis Ellis

Inventor:
Gustave F. Dreher,
by Albert G. Davis
His Attorney.

G. F. DREHER.
PROCESS OF MAKING INSULATING FABRIC.
APPLICATION FILED AUG. 6, 1910.

1,076,874.

Patented Oct. 28, 1913.

2 SHEETS—SHEET 2.

Witnesses:
Marcus L. Byng.
J. Ellis Glen.

Inventor:
Gustave F. Dreher,
by Albert G. Davis
His Attorney

UNITED STATES PATENT OFFICE.

GUSTAVE F. DREHER, OF SCHENECTADY, NEW YORK, ASSIGNOR TO GENERAL ELECTRIC COMPANY, A CORPORATION OF NEW YORK.

PROCESS OF MAKING INSULATING FABRIC.

1,076,874.  Specification of Letters Patent.  Patented Oct. 28, 1913.

Application filed August 6, 1910. Serial No. 575,887.

*To all whom it may concern:*

Be it known that I, GUSTAVE F. DREHER, a citizen of the United States, residing at Schenectady, county of Schenectady, State of New York, have invented certain new and useful Improvements in Processes of Making Insulating Fabric, of which the following is a specification.

This invention relates to the manufacture of fire-proof insulating materials, such as asbestos fabrics and the like, and has for its object the provision of material of this character having properties which render it suitable for use as a cloth or tape in the insulation of electrical apparatus.

One of the objects of my invention is to produce an asbestos sheet or fabric from unspun rovings, which may be united in any manner, as by matting or felting them together and applying adhesive thereto. In carrying out my invention, therefore, I employ a plurality of asbestos rovings which are laid parallel with each other and united to form a fabric. These rovings, which are made by twisting a carded web of the flocculent material, being in a soft, unspun condition, may be readily matted together to form a practically continuous fabric. The fibers may then be further bound together by an adhesive. The asbestos rovings are preferably caused to move adjacent and parallel with each other on an endless belt. In order to unite these rovings I cause them to be moistened during their travel and then operated upon in some manner as by means of a brush to cause the rovings to be flattened and matted together. The fiber may then be dried and further flattened by passing it between compression rolls, after which it may be further dried and then saturated with a suitable adhesive. The varnish may then be dried and the fiber further treated by calendering or the like.

Figure 1:
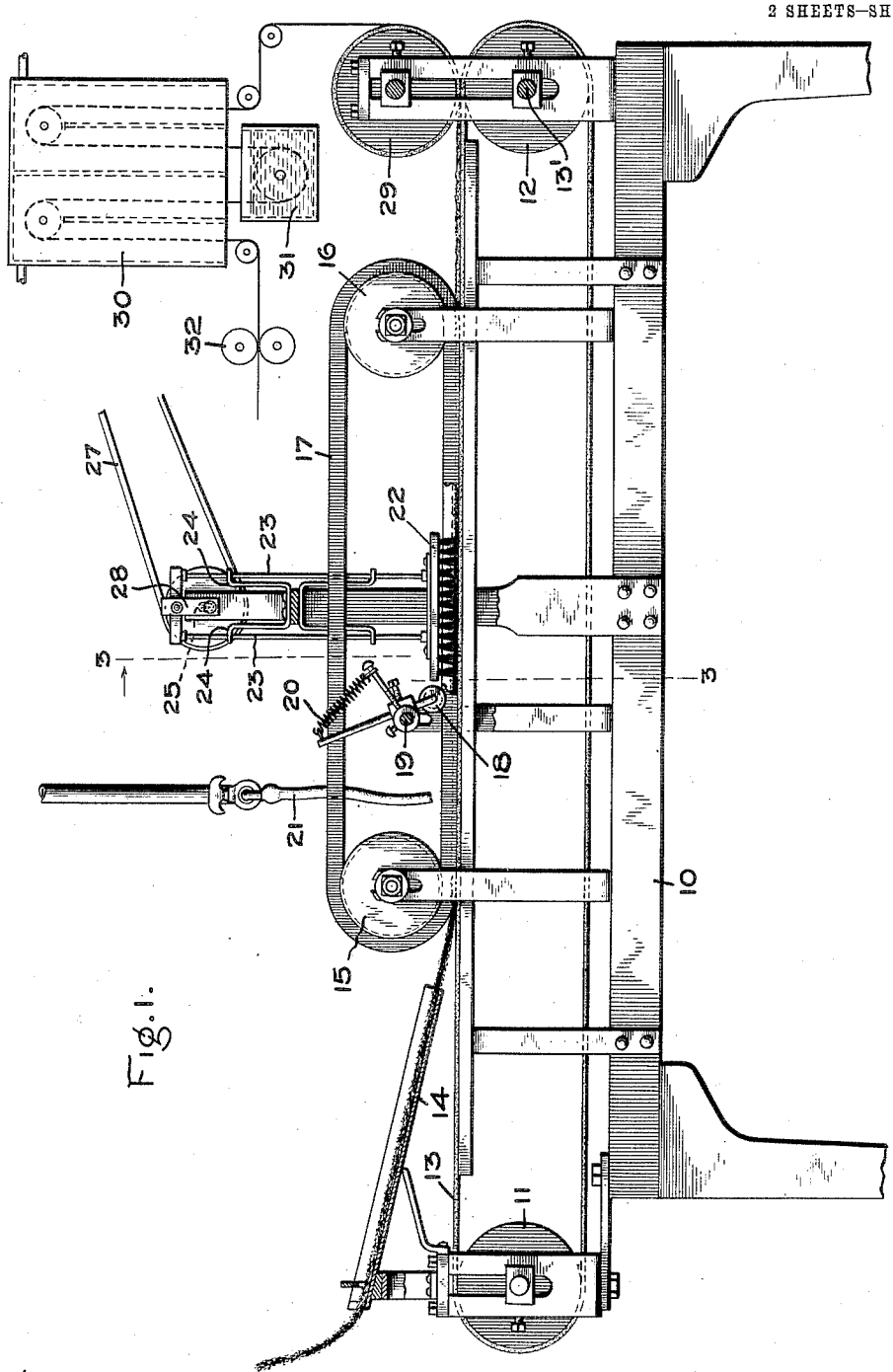
Figure 2:
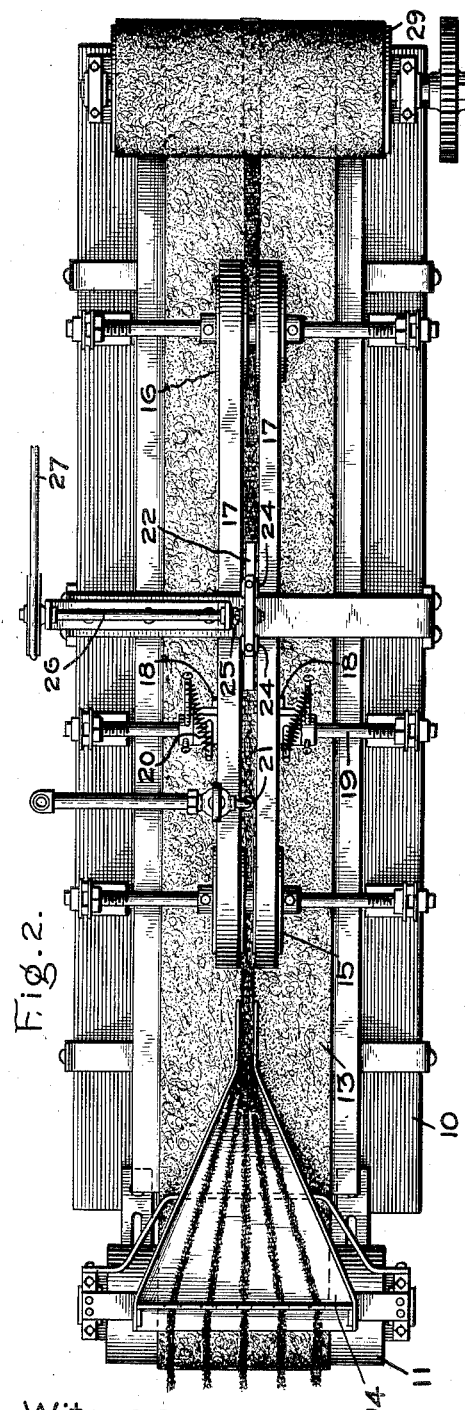
Figure 3:
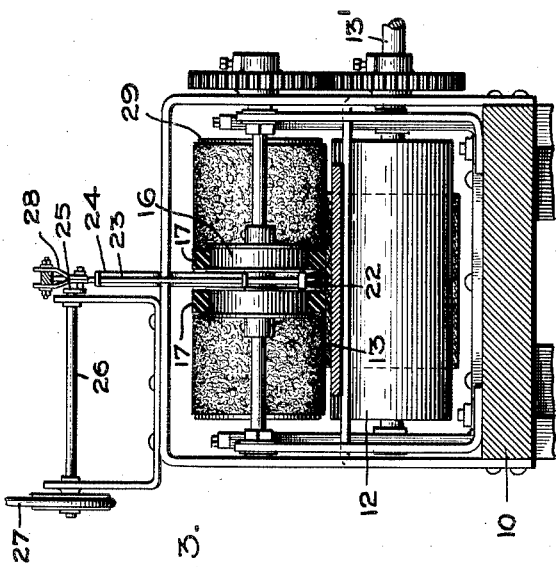

In the accompanying drawing, in which I have shown a machine suitable for carrying out my invention, Figure 1 is a side view of the machine; Fig. 2 represents a plan view of the same; and Fig. 3 represents a section on the line 3—3 of Fig. 1, looking in the direction of the arrow.

Referring to the drawings, 10 represents the frame of my machine, having adjustably mounted at opposite ends rollers 11 and 12 for carrying an endless belt 13 driven in any suitable manner from shaft 13'. This belt may be of any suitable material, as, for instance, felt or the like. Mounted above the roller 11 is a chute or trough 14, through which the rovings are fed on to the traveling belt. The sides of this chute approach each other so as to gradually bring the rovings together and make them parallel at the forward end of the chute.

Mounted above the belt 13 are pulleys 15 and 16 arranged in pairs for supporting the two parallel endless belts 17. These belts are shown to be of considerable thickness and square in section, and are preferably made of some such material as rubber or the like. These belts are spaced apart a distance equal to the width of the fabric required. I have shown the machine arranged to make narrow tape and the belts are therefore quite close together. The spacing of the belts may, however, be varied by adjusting the pulleys 15 and 16 on their shafts. These endless belts are in engagement with the belt 13 and are driven thereby, thus forming a channel for supporting the web and engaging it on two sides. In order to press the belts 17 into close engagement with the belt 13, I provide the two tension rollers 18 pivoted upon the stationary cross bar 19 and pressed upon the belt by means of the spring 20.

In order to moisten the material as it passes through the machine preliminary to uniting the fabrics, I arrange a pipe 21, which feeds fluid, such as water, down between the belts and on to the material, the pipe being arranged to simply apply the water drop by drop.

In order to cause the rovings to unite, I have arranged a reciprocating brush 22 which is caused to engage the web and mat the fibers together. Since the web is moving, the brush, as it strikes the web, gives a kind of patting action which causes the fiber to mat or felt together, thereby making a substantially continuous fabric out of the separate rovings.

The brush 22 is provided with vertical rods 23 joined at the top by a cross piece to form a framework. This framework is reciprocated vertically in guides 24 upon the fixed frame of the machine and is driven by means of a crank 25 on the shaft 26 which in turn is driven by any suitable source of power from the belt 27. The crank 25 is connected with the movable brush frame by a connecting rod or link 28 having its upper end pivoted to the frame and its lower end connected with the crank. As the shaft 26 revolves, the brush will be reciprocated so as to continuously pat the web as it passes underneath the brush. After leaving the brush the web passes between the roller 12 and the roller 29, which are arranged to form compression rolls to flatten and partially dry the fabric. The fabric may then be passed through the heating chamber 30, where it is thoroughly dried, thence through an adhesive, as, for instance, a suitable varnish, at 31, thence through the heating chamber again to dry the varnish and finally through the calender rolls 32.

The machine above described is shown merely for purposes of illustrating one means of carrying out my invention. It will be understood, of course, that the arrangement shown is merely typical, since the machine, as well as the article of manufacture produced thereby and the process of making it, may be modified by those skilled in the art without departing from the spirit of my invention, the scope of which is set forth in the annexed claims.

What I claim as new and desire to secure by Letters Patent of the United States, is,—

1. The process of making asbestos fabrics which consists in moistening a plurality of adjacent asbestos rovings and then brushing them to cause them to unite and form a continuous fabric.

2. The process of making asbestos fabric which consists in causing a plurality of asbestos rovings to travel adjacent each other in parallel relation, moistening said rovings, and then brushing them while in motion to cause them to unite to form a continuous fabric.

3. The process of making asbestos fabric which consists in causing a plurality of asbestos rovings to travel adjacent each other in parallel relation, moistening said rovings, brushing them while in motion to cause them to unite to form a continuous fabric, and then applying adhesive to the fabric.

In witness whereof, I have hereunto set my hand this 3rd day of August, 1910.

GUSTAVE F. DREHER.

Witnesses:
HELEN ORFORD,
BENJAMIN B. HULL.